July 31, 1928.
O. ROCKENBAUER
1,678,955
TAMPERING INDICATING DEVICE FOR GAS METERS
Filed Nov. 23, 1926
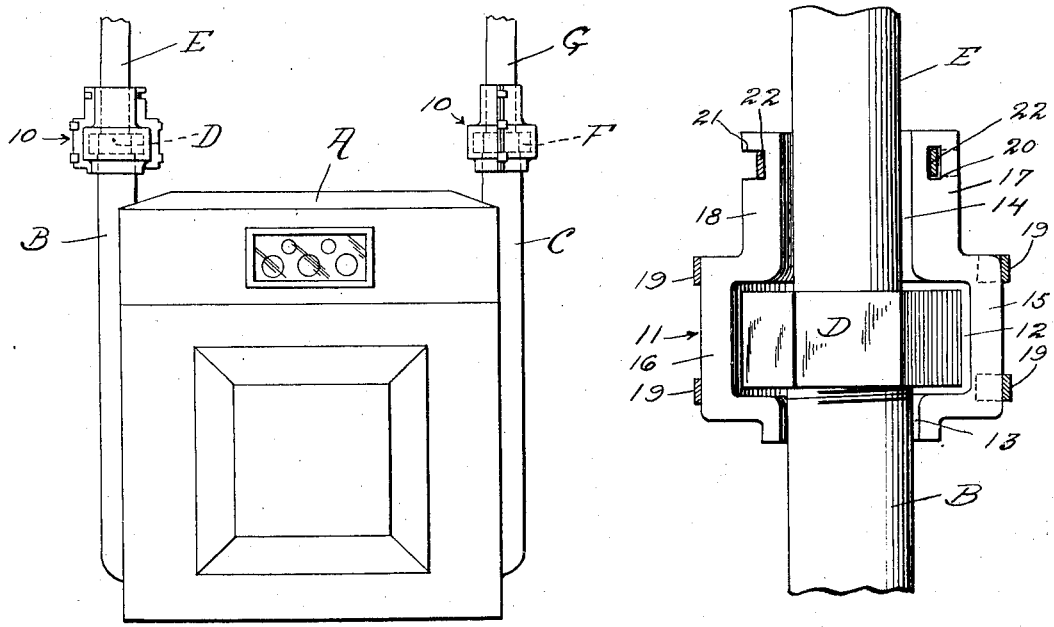
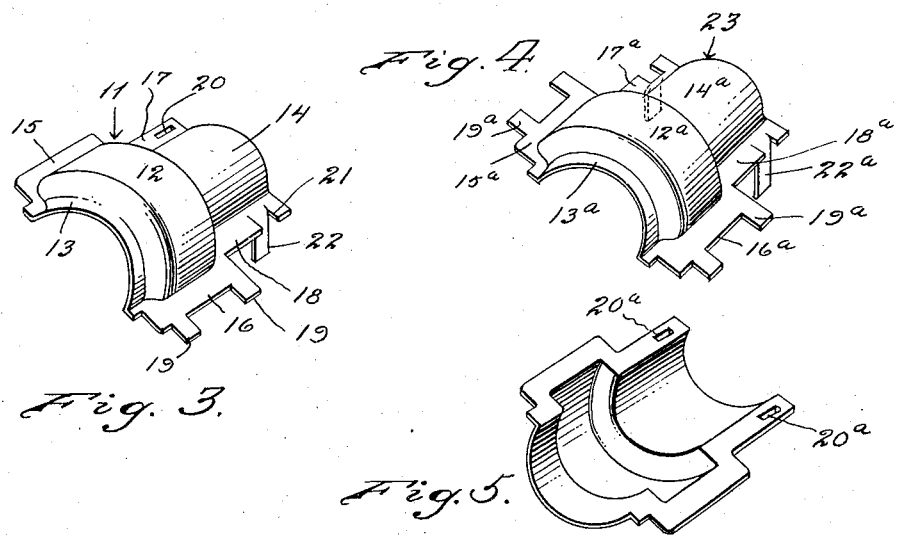
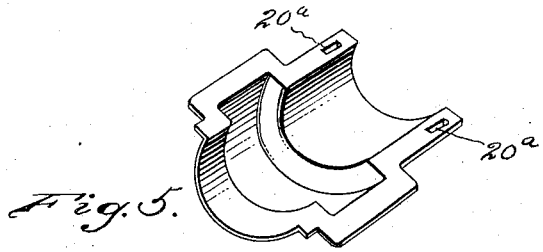
Inventor
Otto Rockenbauer
By John Milton Jester
his Attorney Patented July 31, 1928.

1,678,955

UNITED STATES PATENT OFFICE.

OTTO ROCKENBAUER, OF WESTVILLE, NEW JERSEY.

TAMPERING-INDICATING DEVICE FOR GAS METERS.

Application filed November 23, 1926. Serial No. 150,257.

This invention relates to protective and indicating devices designed particularly for use in connection with gas meters and has for its object the provision of a protector or seal adapted to be engaged about the union on the inlet and outlet pipes of a gas meter so as to prevent ready access thereto and unscrewing thereof and to indicate that tampering has been attempted.

It is well known that it is a common practice among unscrupulous persons to defraud gas companies either by unscrewing the union on the inlet side of the meter and attaching a pipe directly to the incoming pipe line so that the gas used will not pass through the meter at all, or else by unscrewing the union at the outlet side of the meter and inserting a wire to disorganize and prevent operation of the registering mechanism. In the latter instance the union is of course replaced after the wire is inserted but the flow of gas through the meter does not operate the mechanism thereof.

It is in view of the foregoing that I have designed the present invention which has for an important object the provision of a protector or seal which may be readily placed in position about the union and which is of such construction that if it is removed it cannot be replaced, its absence or its mutilation clearly indicating to the meter reader that unauthorized tampering with the meter has been resorted to.

A more specific object of the invention is to provide a union protector or seal which is not only capable of use in connection with gas meters but which may be employed in connection with other pipe lines wherever it is desirable to prevent tampering.

Still another object, and an important one, is to provide a device of this character so constructed and arranged that it may be placed in position without any special tools, ordinary pliers being entirely sufficient for the purpose.

A still more specific object is to provide a union protector or seal comprising a pair of members which may be either counterpart or complementary and which are provided with locking lugs for holding the parts together when in applied position upon a pipe and union, the material being such that after the lugs are once bent into holding position subsequent bending thereof to effect detachment of the protector will result in breaking off the lugs and giving a clear indication that tampering or theft has been at least attempted.

An additional object is to provide a device of this character which will be very simple and inexpensive to manufacture, easy to apply, positive in action, and a general improvement in the art.

With the above and other objects and advantages in view, the invention preferably consists in the arrangement and combination of parts and detailed structural features to be hereinafter more fully described and claimed, and illustrated in the accompanying drawing in which:

Figure 1 is a front elevation of a gas meter showing the invention in applied position, the protector on the outlet pipe being shown in a position at right angles to that upon the inlet pipe, Figure 2 is a sectional view taken longitudinally of the pipe line and along the plane at which the mating members meet, only the retaining lugs being in section, Figure 3 is a perspective view of one of the counterpart members used in the preferred form of the invention, and Figures 4 and 5 are perspective views of the two members employed in a modified form of the invention.

Referring more particularly to the drawings, the letter A designates a gas meter having the usual inlet conduit B and outlet conduit C to the former of which is connected, by a union D, the feed pipe E, and to the latter of which is connected, by a union F, the pipe line G which supplies gas to the building in which the meter is installed. It is these unions E or F which are unscrewed when an attempt is made to steal gas either by preventing its flow through the meter or by rendering the meter inoperative.

In carrying out the present invention I provide a protector or seal for each of these unions, the entire protector being designated as a whole by the numeral 10. In the preferred form, this protector comprises a pair of counterpart members 11 each of which may be readily stamped out of sheet metal or otherwise formed to have the desired shape. However, for the sake of cheapness in production stamping out of sheet metal is by far preferable. Each of these members includes a substantially semicylindrical portion 12 at opposite sides of which are reduced semicylindrical portions 13 and 14. The portion 12 is intended to be of sufficiently large diameter that the counterpart members may be engaged about the union, and the portions 13 and 14 of such diameters as to be capable of accommodating the meter conduits or the inlet and outlet pipes, respectively. The purpose of having the portions 13 and 14 reduced with respect to the portion 12 is to prevent longitudinal displacement of the protector when applied. Each of the sections or members 11 is disclosed as having marginal flanges at its side edges, the portions of the flanges adjacent the portion 12 being designated by the numerals 15 and 16 and the portions at the side edges of the semicylindrical portions 14 being indicated at 17 and 18. The flange 16 is shown as provided with a plurality of outstanding lugs 19, the flange 17 is shown as having a slot 20 therein and the flange 18 is represented as cut at 21 to define a tongue 22 which is extended at right angles to the flange on which it is formed and which is so positioned as to be capable of insertion through the slot 20 in the flange 17 of the other counterpart member.

In the modified form disclosed in Figures 4 and 5 the structure is the same in its general aspect. The only difference is that use is made of two separate members 23 and 24 which are not counterpart but which are the same as in the first described form in so far as the portions 12ª, 13ª and 14ª, corresponding respectively to the portions 12, 13 and 14 are concerned. In this form of the invention the member 23 has its flange portions 15ª and 16ª, corresponding to the flanges 15 and 16 respectively, both formed with lugs 19ª. Furthermore, both of the fianges 18ª are shown as provided with the tongues 22ª corresponding to the tongues 22. The member 24 is of the same construction except that the marginal flanges are not provided with any lugs but are formed at both sides with slots 20ª, corresponding to the single slot 20 of the other form and intended for the reception of the tongues 22ª.

In the use of the first form of the device, the counterpart members 11 are engaged about the union to be protected with the tongue 22 of each passing through the slot 20 of the other. These tongues are then mashed over or clinched as indicated in Figure 1. The lugs 19 on each are clinched over the flange 15 of the other section or member.

In applying the modified form, the members 23 and 24 are placed about the union with the tongues 22ª entering the slots 20ª, subsequently to which these tongues are mashed over or clinched and the lugs 19ª clinched over onto the flanges of the other section or member. Regardless of which form of the device is used it is intended that the material be of such nature that after the clinching has been carried out to effect the holding action, any subsequent bending of the tongues or lugs to effect disconnection of the parts or sections will cause them to break off. It will consequently be apparent that if an unscrupulous person does remove or attempt to remove the protector for the purpose of stealing gas such attempt will be clearly indicated to the meter reader or inspector so that proper steps may be taken against the guilty party.

From the foregoing description and a study of the drawings it will be apparent that I have thus provided a very simply constructed and inexpensive device for the purpose specified which will efficiently perform all the functions for which it is intended. It is believed that the construction, operation and advantages will be readily apparent to one skilled in the art without further explanation.

While I have shown and described the preferred embodiments of the invention, it should be understood that I reserve the right to make such changes in the form, construction and arrangement of parts as will not depart from the spirit of the invention or the scope of the subjoined claims.

Having thus described the invention, I claim:

1. A pipe union protector comprising a pair of members of similar form adapted for disposition about a union and the pipes adjacent thereto to form an enclosure therefor, and frangible means for holding said members together comprising lugs on each adapted to be clinchingly engaged with the other.

2. A union protector of the character described comprising a pair of members each of semicylindrical form and including portions of different diameters adapted respectively for engagement about a union and the pipes connected thereby, said members having marginal flanges at the side edges, said flanges being formed with interfitting tongues and slots and with laterally extending lugs, the tongues and lugs being adapted to be clinched about the flanges of the assembled members.

3. A union protector of the character described comprising a pair of members each of semicylindrical form and including portions of different diameters adapted respectively for engagement about a union and the pipes connected thereby, said members having marginal flanges at the side edges, said flanges being formed with interfitting tongues and slots and with laterally extending lugs, the tongues and lugs being adapted to be clinched about the flanges of the assembled members and being of a character to break upon subsequent bending in the attempt to effect disconnection of the members.

4. A pipe union protector comprising a pair of counterpart members adapted to be engaged upon a union and the adjacent pipes in embracing and enclosing relation thereto, each of said members being formed from a single piece of material and including a central cylindrical portion to be located at the union and further including outer cylindrical portions of less diameter adapted to be located at the pipes adjacent the union, each member further having laterally extending flanges at its side edges, the flange at one side of the central cylindrical portion being formed with lugs and the flange at the same side of one end portion being formed with a tongue, and the flange at the opposite side of said end portion being formed with a slot adapted to receive the tongue of the other counterpart member when the two are assembled about the union, and the tongue and lugs on each member being adapted to be clinched about the flange on the other member, the material being such that said tongues and lugs will break upon subsequent bending.

In testimony whereof I affix my signature.

OTTO ROCKENBAUER.